Patented Apr. 23, 1929.

1,710,133

UNITED STATES PATENT OFFICE.

GUSTAV WINKLER, OF VIENNA, AUSTRIA, ASSIGNOR TO ALFRED ZIERER, OF VIENNA, AUSTRIA.

PROCESS FOR THE PREPARATION OF A MILD AROMATIC YOGHURT CURDLED MILK OR A SWEET YOGHURT JUNKET.

No Drawing. Application filed May 18, 1927, Serial No. 192,481, and in Austria June 9, 1926.

This invention relates to the manufacture of a mild aromatic yoghurt curdled milk, which is of a lower degree of acidity than ordinary yoghurt, while containing the normal quantity of yoghurt bacteria.

The preparation of yoghurt is generally carried out by mixing boiled or pasteurized milk with pure cultures of the yoghurt bacteria and keeping it at a temperature of 40° to 45° C. until it is curdled. Yoghurt milk of this kind usually has a high degree of acidity and cannot, for this reason, be taken by many persons: children, in particular, dislike it and often will not drink it at all. Furthermore, the peculiar smell and taste of yoghurt milk is repulsive to many.

Now according to the present invention, a milk is prepared which is more readily digestible and has not the yoghurt smell and taste although it lacks none of the valuable dietetic properties of ordinary yoghurt milk. In the preparation of this milk the true yoghurt bacteria are caused to grow and multiply in the most favourable manner even at temperatures of 28° to 32° C., by the cooperation of certain cocci, bacteria of the group occurring prolifically in the milk and even in the udder itself and which produce acid and rennet, bacteria of the group *Micrococcus lactis acidi* Löhnis and certain kinds of yeast of the torula and mycoderma groups which produce neither alcohol nor carbonic acid. Thereby an amount of acid is obtained which is less than that of the ordinary yoghurt and is not perceptible to taste. The activity of the yoghurt bacteria is nevertheless retained and the amount of yoghurt bacteria contained in the preparation is not less than in the ordinary yoghurt. On the other hand, the products do not possess the typical yoghurt smell and taste.

In making the preparation, full milk or skimmed milk, to which sugar has been added, is boiled or pasteurized, mixed if necessary with fruit essences or similar flavourings of sterilized fruit juices, allowed to cool and then mixed with from 2% to 5% of the ferment resulting from the above mentioned mixed cultures. The temperature is maintained at 28° to 32° C., the milk curdling in about four to six hours. It is then transferred, for storage, to a cool place, preferably to an ice box or refrigerator. Added substances other than those above mentioned are not needed for the preparation of the product.

For the preparation of the cultures to be added, the different micro-organisms are grown separately and in a pure state on agar nutrient media at a temperature of 28° to 32° C. The appropriate agar culture media are special media. In these the mixed cultures grow well at temperatures from 32° to 40° C., in three to four days in agar tubes, or on plates (Petri dishes), within eight days. As such nutrient media, whey and whey agar come first in order of suitability, then malt extract and malt extract agar and, thirdly, horse and beef bouillon and agar. The last named nutrient media are prepared from the receipt of Löhnis (Landwirtschaftlich-bakteriologisches Praktikum, published by Gebrüder Bornträger, Berlin 1920, pp. 16 to 19) with the addition of from 3% to 4% dextrose. Malt extract agar is prepared according to the following directions: 35 grammes of malt meal are stirred up with 100 grammes of water at a temperature of 20° C. and then slowly warmed on a water bath, so that the paste attains in half an hour a temperature of 40° C. and in an hour a temperature of 60° C. It is then kept at a temperature of 60° C. for one hour, filtered until clear and diluted to 10 degrees on the Baumé saccharometer. 0.4% of asparagin and 0.15% of peptone are then added, the mixture boiled for a quarter of an hour and filtered until clear. The clear wort is sterilized at 1½ atmospheres (corresponding to 115° to 120° C.) once every twenty four hours, five times in succession (fractionated). To the clear wort is added from 1% to 1½% of agar; the mixture then allowed to swell for five to six hours and afterwards boiled for half an hour and filtered until clear. As regards sterilization, the procedure to be followed with the clear product is the same as in the case of malt extract. Whey is prepared by mixing fresh skimmed milk at a temperature of 36° to 40° C. with rennet and then cutting up and reducing to the size of millet grains. The whole is filtered through a filter bag and then through paper, until the whey runs off clear. This liquor is then boiled for half an hour, clarified with white of egg, filtered until it remains clear and mixed with 2% of either dextrose, lactose, maltose or galactose. The sterilization of the nutrient media must be carried out fractionally, and the reaction must be faintly acid. The colour of the nutrient medium when finished is a light greenish yellow. For preparation with agar 1% of agar is treated in the usual way (see Löhnis, as above). These agar cultures are then introduced into perfectly sterile skimmed milk, in the proportion of 2:1; 1, that is to say, 50% *Bacterium bulgaricum*, 25% torula and mycoderma and 25% *Micrococcus lactis acidi* Löhnis. The cultures are kept at a temperature of 28° to 32° C. until curdling of the milk takes place and are then cooled. These mixed cultures in the milk are kept growing by continual introduction into sterile skimmed milk and at least one inoculation must take place daily so that the cultures remain vigorous. Such cultures are used in the usual manner for setting up the ferments which serve for the preparation of the product.

In carrying out the above described process for the preparation of a mild, aromatic, dietetic curdled milk, which is similar to the aforesaid yoghurt milk, it is possible to use instead of the *Bacterium bulgaricum* the *Bacillus acidophilus* (*Bacterium acidophilum*) or the *Bacillus bifidus* (*Bacterium bifidum*) also, which originally was cultivated from the intestines of suckling infants and which, when taken with milk, fermented with this bacillus, produces dietetic effects which are similar to those produced by the yoghurt bacterium.

As to the micro-organisms mentioned see: Lactobacillus Acidophilus, by Nicholas Kopeloff, published January, 1926, by The Williams & Wilkins Company, Baltimore; Moro E., Morphologische & biologische Untersuchungen über die Darmbakterien des Säuglings, Jahrbuch für Kinderheilkunde 61, 1905, pages 687 to 734 and 870 to 890; Tissier H., Etude sur la flore intestinale chez le nourisson, Thèse No. 259, published by G. Carrée et Naud, Paris, 1899–1900; Kendall A. and Hauer R. C., Studies in bacterial metabolism, Bacillus bifidus, LXXI Journal Inf. Dis. 35, 1924, the 77–88.

What I claim is:

1. A process of preparing a readily digestible milk product having the valuable dietetic properties of ordinary yoghurt milk but being devoid of the disagreeable smell and taste of such yoghurt milk which comprises mixing sterilized milk with a ferment comprising pure cultures of bacteria capable of producing the dietetic effects produced by yoghurt bacteria, acid and rennet producing cocci and yeast producing neither alcohol nor carbonic acid.

2. A process of preparing a readily digestible milk product having the valuble dietetic properties of ordinary yoghurt milk but being devoid of the disagreeable smell and taste of such yoghurt milk which comprises mixing sterilized milk with a ferment comprising a mixture of pure cultures of bacteria chosen from the following, *Bacterium bulgaricum*, *Bacterium acidophilum*, *Bacillus bifidus;* acid and rennet producing cocci; and yeasts chosen from the following, torula and mycoderma.

3. A process of preparing a readily digestible milk product having the valuable dietetic properties of ordinary yoghurt milk but being devoid of the disagreeable smell and taste of such yoghurt milk which comprises mixing sterilized milk with a ferment comprising a mixture of *Bacterium bulgaricum*, *Micrococcus lactis acidi* Löhnis and a mixture of torula and mycoderma yeasts.

4. A process of preparing a readily digestible milk product having the valuable dietetic properties of ordinary yoghurt milk but being devoid of the disagreeable smell and taste of such yoghurt milk which comprises mixing sterilized milk with a ferment comprising a mixture of two parts *Bacterium bulgaricum*, one part *Micrococcus lactis acidi* Löhnis and 1 part of a mixture of torula and mycoderma yeasts.

5. A new milk product comprising milk containing the fermentation products of a mixture of yoghurt bacteria, acid and rennet producing cocci and yeasts producing neither alcohol nor carbonic acid.

6. A new milk product comprising milk containing the fermentation products of a mixture of *Bacterium bulgaricum*, *Micrococcus lactis acidi* Löhnis and a mixture of torula and mycoderma yeasts.

In testimony whereof I affix my signature.

GUSTAV WINKLER.